Patented Apr. 15, 1930

1,754,434

UNITED STATES PATENT OFFICE

JOSEF PERINO, OF STETTIN, GERMANY

PROCESS OF MANUFACTURING A VEGETABLE ALIMENTARY EXTRACT

No Drawing. Application filed October 18, 1927, Serial No. 227,057, and in Germany October 22, 1926.

This invention has reference to improvements in the manufacture of food extract products from vegetable material, and it is intended among other objects to increase the adaptability and digestibility of the vegetable material by a peculiar treatment which is sometimes designated by the generic term of vitalizing such substances, and in connection therewith it is a further object of my invention to preserve the active properties of the vitamines existing in the food material. The invention makes it possible to obtain a food extract from plants or parts thereof which is rich in vitalized mineral substances preferably present in organic combinations and containing a maximum content of vitamines. In accordance with the previous art it has only been intended to vitalize the mineral constituents of the plants, while the vitamines which, at that time, were not yet known were entirely disregarded in similar previous processes. The previous treatment disclosed by the prior art and comprising the action of an addition of carbonates of alkali and of the oxygen of the air, and the digestion of the substances under reduced pressure or in vacuo with the resulting splitting off of the carbonic acid and the formation of organic alkali compounds, is not suitable for the preservation of the vitamines which are destroyed by this treatment. In view thereof my invention provides means by which the vitamines are obtained in their most active condition, while the mineral constituents are vitalized in accordance with the most recent scientific developments by the employment of suitable agents and by a complete change of the previous process referred to, and in further pursuance thereof the invention provides for the substantial elimination of undesired decomposition products of organic substances during the digestion due to the presence of injurious germs.

In the practice of my invention the desired result is accomplished by the very thorough action of the ultra-violet rays combined with the treatment with suitable alimentary salts and an atmosphere substantially free from oxygen, and by the employment of reduced pressure or vacuum the conditions of the reaction being so adjusted that a very rich food-product of particularly high physiologic value is obtained. In view thereof I first proceed by dividing the vegetables to be extracted into two portions one of which comprises the albuminous leguminous plants and adapted particularly for the accumulation and the vitalizing of the mineral substances, while the other portion comprises the leaf-vegetables, herbs, roots, and bulbous vegetables, all of which are rich in vitamines for the purpose of obtaining and accumulating the vitamines. The separately produced extracts are intimately mixed after the evaporation has been effected under reduced pressure or in vacuo to the desired consistency; or the evaporation may be carried out by atomizing means, so as to obtain a dry powder, or by both of these processes combined.

For both kinds of plants alkali-phosphates are employed as a means for the chemical treatment thereof, such salts being distinguished by their high food-value. For the leguminous, albumin containing plants the tertiary alkali-phosphates ($K_3PO_4$ and $Na_3PO_4$) of alkaline reaction are particularly adapted, while for the extraction of the vitamines from the leaf-vegetables and the like, above referred to, the secondary alkali-phosphates of neutral reaction ($K_2HPO_4$ and $Na_2HPO_4$) are most suitable which in the presence of carbonic acid exhibit a faintly acid reaction, and which therefore contribute to increase the keeping qualities of the vitamines it being well known that some of the vitamines, thus for instance the factors B and C are attacked by the action of alkaline agents. Inasmuch as carbonic acid decomposes tertiary phosphates and forms secondary and upon continued action of carbonic acid even primary acid-reacting phosphates, it is obvious that my invention provides a means of preventing decay and injury to the valuable vitamines. Besides, the phosphates operate as a very efficient emulsifying agent and in combination with and aided by the action of the vacuum or reduced pressure they facilitate the exudation and extraction of the contents of the cellular tissue. Moreover, by the action of the tertiary alkali-phosphates upon the vegetable casein or legumin of the leguminous plants said phosphates are converted directly into secondary phosphates with the simultaneous formation of soluble caseinates and leguminates. Both extractions and digestions are carried out with constant agitation and combined with the simultaneous treatment with ultra-violet rays, while the atmospheric air is replaced by gases free from oxygen, such as nitrogen or hydrogen on the one hand, and carbonic acid on the other hand. The use of vacuum or underpressure acts to assist in accomplishing the desired result, inasmuch as it facilitates the loosening of the chemical structure required for the vitalizing action, and causes a more complete outward diffusion and extraction of the soluble cellular constituents through the walls of the cells. The use of the vacuum also aids in increasing the keeping qualities of the vitamines inasmuch as thereby the oxygen which is continuously liberated by the chlorophyll of the plant, and which is known to exert a very injurious influence upon the vitamines is removed, and is replaced by inert gases. Then, the combined action of the vacuum and of the emulsifying phosphates produces a foamy consistency of the liquor, which fact aids in the action of the ultra-violet rays which readily permeate the foam. The ultra-violet irradiation moreover produces the effect that it has a vitalizing action on the mineral substances in the presence of the vegetable material and it moreover assists in the preservation and formation of new amounts of vitamines, so as to counteract under all conditions the tendency of these alimentary substances to become decomposed. The conditions herein referred to make it possible to produce photosynthetic processes, particularly with the assistance of the chlorophyll-containing cellular tissue. The combined use of ultra-violet rays and of an atmosphere free from oxygen results moreover in a very strong germicide action.

The practical preferred mode of operation of the process according to this invention is substantially carried out in accordance with the following examples, with the understanding however that the kinds of raw material, proportions of quantities and duration of treatment are subject to change in accordance with varying conditions and requirements:—

1. For leguminous plants:—5 pounds of pea-meal are soaked in an aqueous solution of 2% $K_3PO_4$ and 1% salt $NaCl$, the treatment being effected with agitation at moderate heat (below 60 degrees centigrade) in a vacuum-digestion apparatus provided with stirring means and with means for ultra-violet irradiation. After the apparatus and the irradiating device have been started, and after the atmospheric air has been replaced by nitrogen or hydrogen, an aqueous suspended paste of 8 grams $Ca(OH)_2$, 1 gram $Mg(OH)_2$ and 2 grams $Fe_2(OH)_6$ is gradually added, and the digestion is carried on for one hour to one hour and a half. The milky extract of the leguminous substances thus obtained which, as regards the presence of complex phosphoric-acid-lime-casein-compounds resembles animal milk, is then squeezed off from the residue, and is added to the solution of vitamine-extract from leaf-vegetables which has been prepared in the meantime; and the mixture is desiccated or the extracts are evaporated separately.

2. The procedure for leaf-vegetables rich in vitamines is as follows:—10 pounds of a mixture of suitable vegetables, such as spinach, salad, cabbage, green-kale, carrots and the like in finely subdivided condition are mixed with half a liter of an aqueous solution of 2% $K_2HPO_4$ and 1% $Na_2HPO_4$ and 1% salt $NaCl$ in a vacuum-digestion apparatus of the kind described with reference to the treatment of the leguminous plants. After the apparatus has been started and the irradiation is going on, the atmospheric air in the apparatus is replaced by carbonic-acid-gas and the digestion is carried on for one hour to one hour and a half at moderate heat, below 60 degrees centigrade. The squeezed off liquor is evaporated with or without previous admixture with the leguminous milk referred to, by the action of the vacuum or by an atomizer.

In practice modifications of the particular embodiments of the invention herein referred to by way of exemplification only may be made and any other suitable kinds of materials and chemicals may be used which are suitable for the treatment referred to, without deviating from the spirit and scope of the invention, except as otherwise appears from the appended claims.

I claim:—

1. The process of manufacturing a food product which comprises exposing vegetable, alimentary material substantially with the exclusion of oxygen, and in the presence of soluble phosphates and at a reduced pressure to irradiation by ultra-violet rays, and heating said material to a temperature of approximately not above sixty degrees centigrade during such irradiation.

2. The process of manufacturing a food product, which comprises exposing alimentary plant-material in the presence of secondary soluble phosphates and in an atmosphere of carbonic acid to irradiation by ultra-violet rays, and slightly heating the mixture during such irradiation.

3. The process of manufacturing a food product, which comprises submitting a mixture of alimentary plant material with a dilute solution of soluble phosphates in an atmosphere of carbonic acid and at a temperature, substantially not exceeding sixty degrees centigrade to irradiation by ultra-violet rays, and inspissating the product obtained.

4. The process of manufacturing a food product, which comprises submitting a mixture of a dilute aqueous solution of tertiary phosphates with leguminous plant material together and in admixture with a mixture of a dilute aqueous solution of soluble secondary phosphates in an atmosphere of carbonic acid and at a temperature substantially not exceeding sixty degrees centigrade to irradiation by ultra-violet rays.

5. The process of manufacturing a food product, which comprises digesting alimentary plant-material rich in vitamines and containing leaf- and herb-like constituents with an aqueous solution of about two percent soluble phosphates in an atmosphere of carbonic acid and at a temperature substantially not exceeding sixty degrees centigrade, and submitting the product to irradiation with ultra-violet rays during such digestion.

6. The process of manufacturing a food product, which comprises treating alimentary plant material with an aqueous solution of about two percent soluble phosphates in an atmosphere of carbonic acid at moderate heat, substantially not exceeding sixty degrees centrigrade, and at reduced pressure and submitting the product to irradiation with ultra-violet rays during the treatment.

7. The process of manufacturing a food product, which comprises treating alimentary plant material with an aqueous solution of about two percent soluble phosphates at reduced pressure and in an atmosphere of hydrogen or nitrogen, adding a paste of hydroxides of bivalent calcium-like metals, and submitting the mixture to irradiation with ultra-violet rays during the treatment, and reducing the resulting liquor to the desired consistency.

8. As a new food product an extract of leguminous, herb-like and bulbous vegetables in admixture with soluble acid phosphates vitalized by ultra-violet irradiation and rich in vitamines.

9. As a new food product an inspissated extract of vegetables in admixture with soluble acid reacting phosphates and with carbonates of alkali, vitalized by ultra-violet irradiation, and rich in vitamines of various factors and substantially free from oxidation products.

JOSEF PERINO.